United States Patent
Hoda et al.

(10) Patent No.: US 7,777,818 B2
(45) Date of Patent: Aug. 17, 2010

(54) RECEIVING APPARATUS AND A METHOD FOR SETTING A RECEIVING ANTENNA THEREOF

(75) Inventors: Isao Hoda, Fujisawa (JP); Hitoshi Akiyama, Yokohama (JP); Takatoshi Shirosugi, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 1064 days.

(21) Appl. No.: 11/368,672

(22) Filed: Mar. 7, 2006

(65) Prior Publication Data
US 2006/0282860 A1 Dec. 14, 2006

(30) Foreign Application Priority Data
Jun. 13, 2005 (JP) .............................. 2005-171798

(51) Int. Cl.
*H04N 5/00* (2006.01)
(52) U.S. Cl. ..................................... 348/732
(58) Field of Classification Search ............... None
See application file for complete search history.

(56) References Cited
U.S. PATENT DOCUMENTS

| | | | |
|---|---|---|---|
| 5,801,759 A * | 9/1998 | Limberg ..................... 348/21 |
| 6,985,190 B1 * | 1/2006 | Klopfenstein et al. ....... 348/569 |
| 7,006,040 B2 * | 2/2006 | Henderson et al. .......... 342/372 |
| 7,206,032 B2 * | 4/2007 | Shibusawa ................... 348/732 |
| 7,242,424 B2 * | 7/2007 | Lee ............................. 348/180 |
| 2005/0128362 A1 * | 6/2005 | Teichner et al. ............. 348/725 |

FOREIGN PATENT DOCUMENTS

| | | |
|---|---|---|
| JP | 2001-086019 | 3/2001 |
| JP | 2004-179928 | 6/2004 |

* cited by examiner

*Primary Examiner*—Paulos M Natnael
(74) *Attorney, Agent, or Firm*—Antonelli, Terry, Stout & Kraus, LLP.

(57) ABSTRACT

In a receiving apparatus and a method for setting a receiving antenna thereof, for dissolving a problem of necessity of a large amount of time for channel search, since it needs a time for setting up the receiving antenna at each physical channel, in the channel search operation, including searching of receivable channels and also memorization of an optimal setup for each of the receiving channels, receiving conditions are obtained for all of the physical channels in each of the setups of receiving antenna, and this obtaining of the receiving condition is conducted on all of the setups of the receiving antenna. In that instance, a number of times of controlling the setup of receiving antenna is determined to be a number of combinations of the setups of receiving antenna, and thereby shortening the time necessary for the setup of the receiving antenna and the time necessary for channel preset.

12 Claims, 5 Drawing Sheets

RECEIVING APPARATUS AND A METHOD FOR SETTING A RECEIVING ANTENNA THEREOF

BACKGROUND OF THE INVENTION

The present invention relates to a receiving apparatus and a method for setting a receiving antenna thereof, for receiving broadcasting radio waves, thereby to output vide/audio signals therefrom. And in particular, it relates to a receiving apparatus and a method for setting the receiving antenna, which can execute the function, i.e., channel-search for memorizing an optimum setup of the receiving antenna at every receiving channel in a short time, as well as, searching channels receivable.

A transmitting station and/or a relay station for broadcasting radio waves, in particular, within the terrestrial broadcasting, it/they may be sometimes provided or located in a plural number thereof for one (1) receiving area. For example, in the following Patent Document 1 is disclosed a technology for enabling an automatic adjustment, in particular, on the receiving antenna direction for the optimum receiving.

Patent Document 1: Japanese Patent Laying-Open No. 2001-86019 (2001).

BRIEF SUMMARY OF THE INVENTION

However, with the automatic adjustment method for an antenna for use in receiving digital broadcasting, which was mentioned above, an assumption is made on that the receiving antenna be adjusted to the channel that is tuned at the moment, but no consideration is paid upon a case of the channel-search function for searching the channels receivable.

Also, with the channel-search function for searching the receivable channels, as well as, the optimum setup of the receiving antenna for each receiving channel, because it needs a time for setting the receiving antenna at each physical channel, there occurs a problem that a great deal of time is necessary for the channel-search.

According to the present invention, accomplished by taking the problem mentioned above into the consideration thereof, an object thereof is to provide a receiving apparatus and a method for setting the receiving antenna thereof, enabling the channel-search to be executed in a short time, for memorizing the optimum setup of a receiving antenna at each receiving channel.

For accomplishing the objection mentioned above, according to the present invention, for example, in the structures, a tuning is made at a desired channel from the broadcasting signal received with the antenna, so as to obtain information relating to quality of the tuned broadcasting signal, and information relating to the setup of the antenna is memorized with using that information of the signal quality, wherein the setup of the antenna is controlled by using that antenna setup information.

According to the present invention, it is possible to provide a receiving apparatus and a method for setting the receiving antenna thereof, thereby enabling the channel-search to be executed in a short time, for memorizing the optimum setup of the receiving antenna at each receiving channel.

BRIEF DESCRIPTION OF THE DRAWINGS

Those and other objects, features and advantages of the present invention will become more readily apparent from the following detailed description when taken in conjunction with the accompanying drawings wherein.

DETAILED DESCRIPTION OF THE PREFERRED EMBODIMENT

Hereinafter, embodiments according to the present invention will be fully explained by referring to the attached drawings. However, the same references/marks/numerals therein indicate the similar elements or structures.

Embodiment 1

Figure 6:
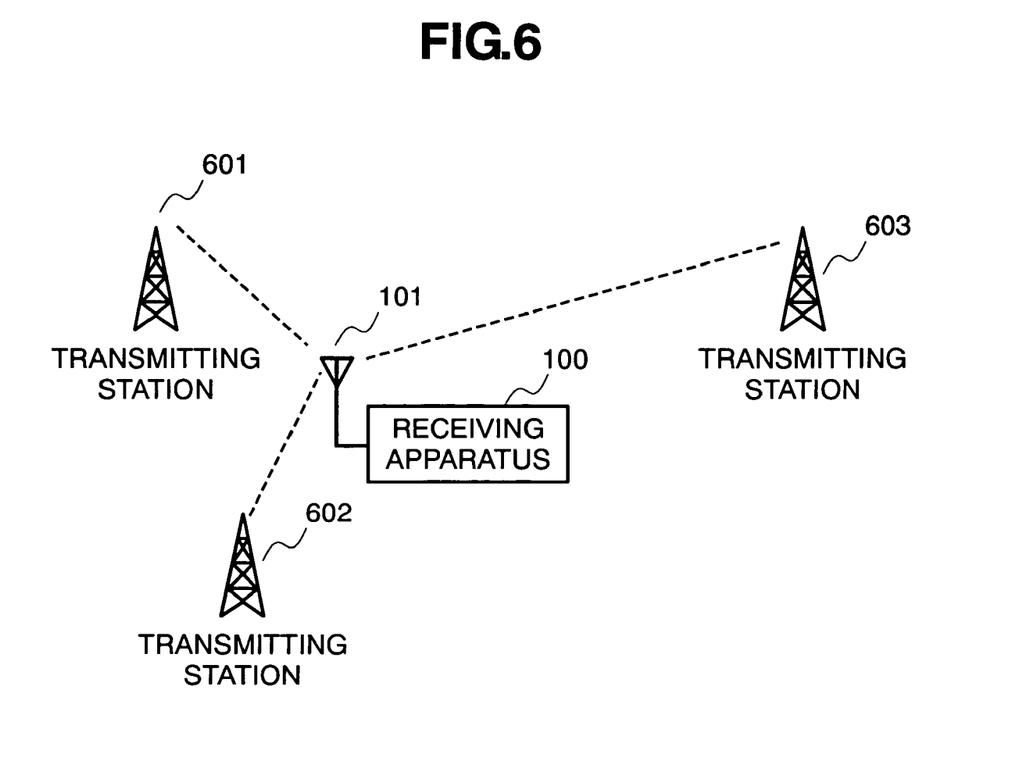
FIG. 6 is a view for showing a situation where a plural number of the transmitting stations and/or the relay stations of the broadcasting radio wavers are located for one (1) receiving area.

Hereinafter, explanation will be made on a first embodiment. FIG. 6 is a view for showing the entire structures of the present embodiment. A receiving apparatus 100, having a receiving antenna 101 therein, receives broadcasting signals from transmitting stations 601, 602 and 603, which are different in the direction and the distance thereof. For the purpose of obtaining preferable video/audio signals within the receiving apparatus 100, adjustment is made upon a direction, an amplification factor, etc., of the receiving antenna, which has directivity thereof.

Figure 1:
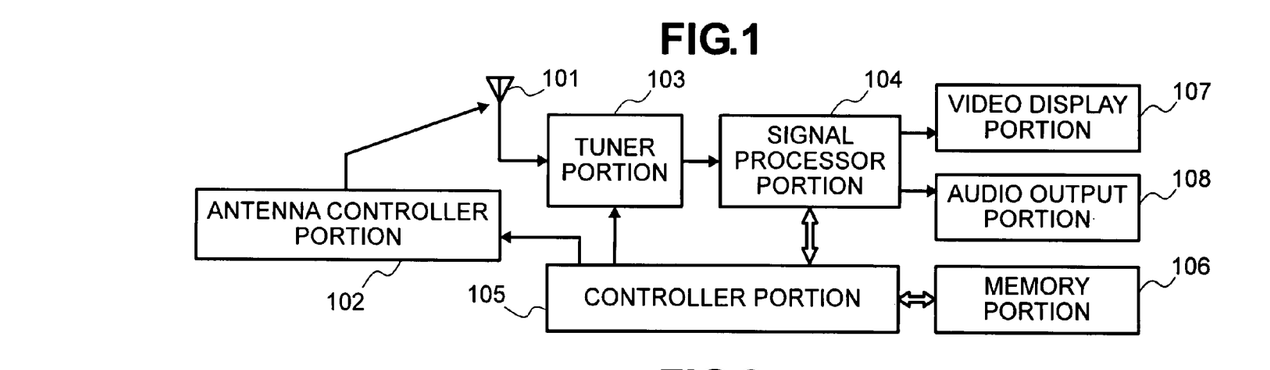
FIG. 1 is a block diagram for showing an example of the structures of a receiving apparatus, according to an embodiment of the present invention.

Hereinafter, explanation will be made in more details thereof. FIG. 1 is a block diagram for showing an example of structures of the receiving apparatus, according to the present embodiment. In this FIG. 1, the receiving antenna 101 has a directivity-changing portion, which changes a receiving sensitivity depending on the direction of an element. The receiving antenna 101 may also have a variable amplifier portion, which can change the amplification factor thereof, and a polarity-reversing portion, which can reverse the polarity of a receiving signal, etc. The setup of the receiving antenna 101 is controlled through an antenna-controlling portion 102. Also, processes within the antenna-controller portion 102, a tuner portion, and a signal processor portion 104 are controlled through a controller portion 105. The receiving antenna 101 receives the broadcasting radio waves, so as to supply a receiving signal to the tuner portion 103. The tuner portion 103 tunes in a signal of desired channel from the receiving signals supplied thereto, and supplies it to the signal processor portion 104. The signal processor portion 104 conducts demodulating/decoding processes on the receiving signal supplied thereto, depending on the broadcasting method, thereby supplying a video signal to a video display portion 107 and an audio signal to an audio output portion 108, respectively.

Also, the signal processor portion 104 has a function of detecting the information relating to signal quality of the receiving signal (hereinafter, being called "signal quality information"), and the controller portion 105 is able to obtain the signal quality information of the receiving signal from the signal processor portion 104. To be such signal quality information may be assumed a synchronization condition with the receiving signal in the demodulating process, a ratio of the receiving signal to noises (i.e., SNR (Signal to Noise Ratio)), and a bit error ratio in error correcting process, and/or an ACG control voltage, etc.

The controller portion 105 memorizes setups for the antenna controller portion 102, setups for the tuner portion 103, and signal quality information obtained from the signal processor portion 104, into a memory portion 106. The controller portion 105 may also memorize the setup for the antenna controller portion 102, the setup for the tuner portion 103, and the signal quality information obtained from the signal processor portion 104 into the memory portion 106, bit relating them to one another.

Figure 2:
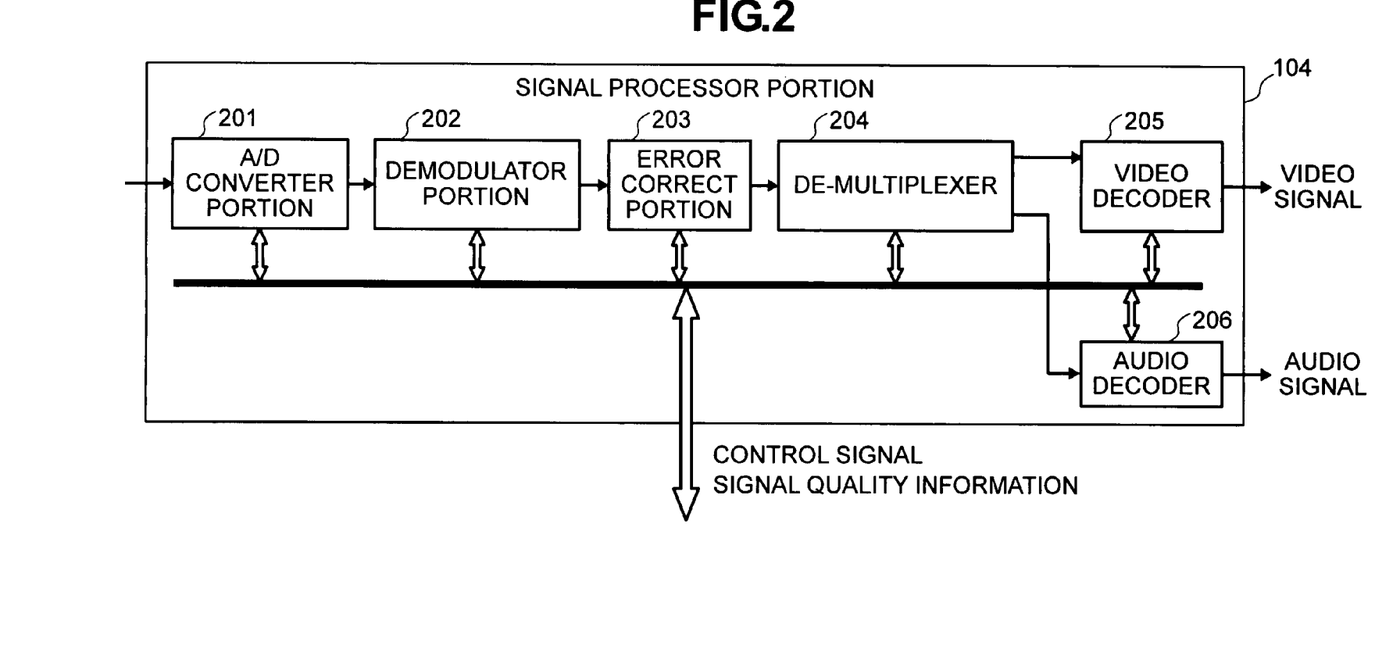
FIG. 2 is a block diagram for explaining the details of processes within a signal processor portion, within the receiving apparatus according to the embodiment of the present invention.

Hereinafter, explanation will be given about the processes in the signal processor portion 104 shown in FIG. 1, in more details thereof. FIG. 2 is a block diagram for explaining the details of the signal processor portion 104 shown in FIG. 1. The receiving signal tuned through the tuner portion 103 is supplied to an A/D converter portion 201. The A/D converter portion 201 converts the signal supplied thereto into a digital signal, so as to supply it to a demodulator portion 202. The demodulator portion 202 conducts the demodulation process on the signal supplied depending on the broadcasting method thereof, and supplies the demodulated data to an error correct portion 203.

In a case of U.S. terrestrial broadcasting, demodulation is made on the signal, which is modulated through the 8VSB (8 values Vestigial Side Band) modulation method, within the demodulator portion 202. The error-correcting portion 203 supplies the demodulated data after making error correction thereon. A de-multiplexer 204 divides the supplied data, in a multiplex manner; thereby supplying the video data to a video decoder 205 and the audio data to an audio decoder 206, respectively. The video decoder 205 converts the video data into a video signal, so as to supply it to the video display portion 107. The audio decoder 206 converts the audio data into the audio signal, so as to supply it to the audio output portion 108.

The A/D converter portion 201, the demodulator portion 202, the error correct portion 203, the de-multiplexer 204, the video decoder 205, and the audio decoder 206 are controlled, respectively, through the controller portion 105 shown in FIG. 1. Also, the demodulator portion 202 detects the synchronizing condition with the receiving signal in the demodulating process and the SNR of the receiving signal, and the error detect portion 203 detects the bit error ratio of the demodulated data, and the A/D converter portion 201 produces an AGC control voltage so that the receiving signal comes to be constant in the level thereof.

Within the receiving apparatus according to the present embodiment, the setup for bringing the receiving antenna into the most suitable receiving condition is memorized into the memory portion 106, at an initial channel presetting time when setting an antenna, or at a re-channel presetting time due to a scanning operation made by a user, and then, ordinarily when tuning is made, the setup of the receiving antenna (or, "receiving antenna setup", or "antenna setup") is carried out, in accordance with the setup memorized in the memory portion 106, corresponding to the tuned channel.

Hereinafter, detailed explanation will be made about an initial channel presetting method in the receiving apparatus according to the present embodiment, by referring to FIGS. 3 and 4.

Figure 3:
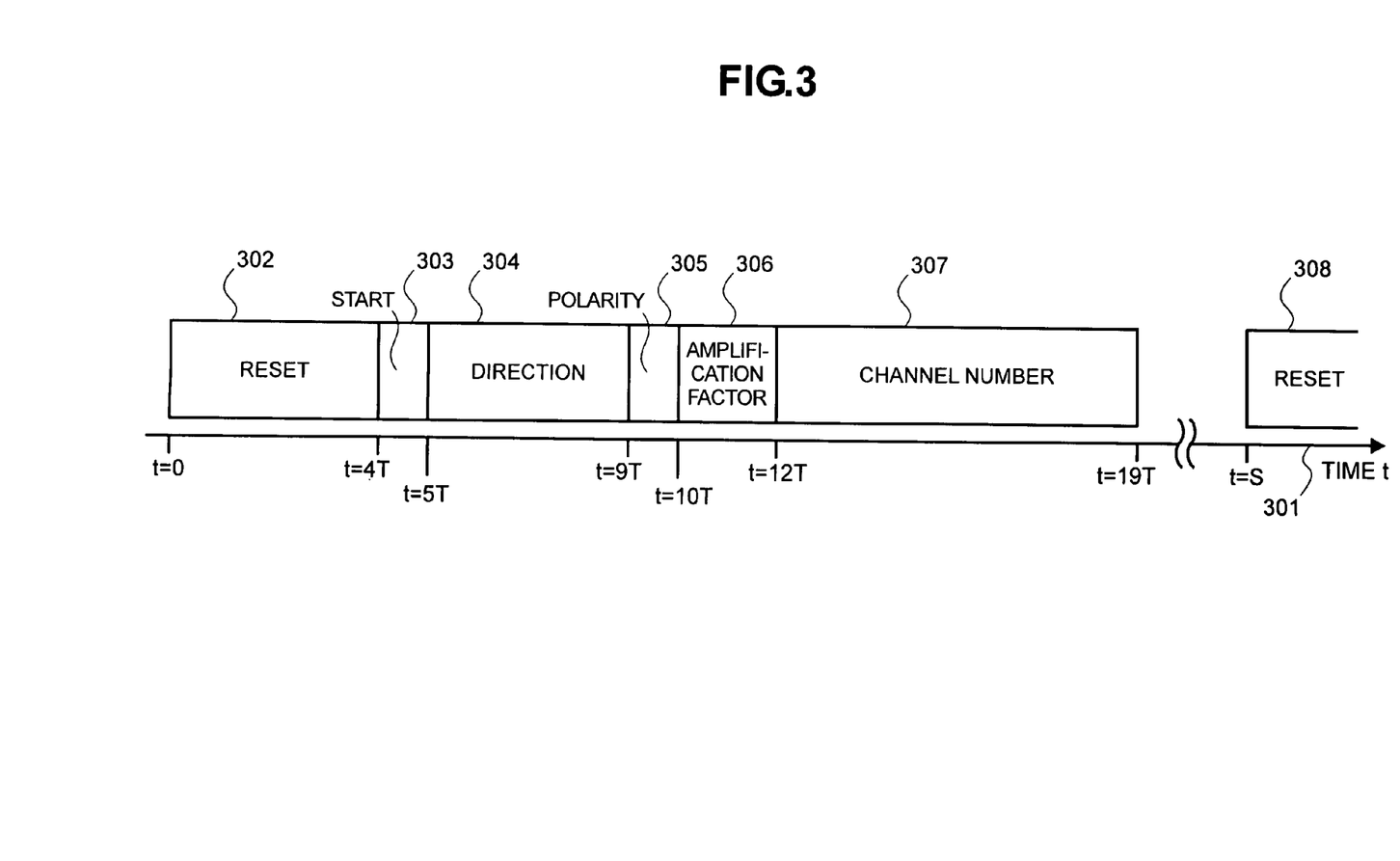
FIG. 3 is a view for showing an example of a receiving antenna control signal for controlling an antenna-controlling portion, within the receiving apparatus according to the embodiment of the present invention.

FIG. 3 shows an example of a receiving antenna control signal, for controlling the antenna controller portion 102 from the control proton 105, in the apparatus according to the present embodiment. In this FIG. 3, a reference numeral 301 indicates a time axis, 302-307 a set of control signals for controlling the antenna controller portion 102, and a marl "T" a clock cycle of a serial data. A reference numeral 302 indicates a reset signal of four (4) bits, 303 a start bit of one (1) bit indicative of starting of setup data, 304 receiving antenna direction setup data of four (4) bits, 305 receiving antenna polarity setup data of one (1) bit, 306 receiving antenna amplification factor setup data of two (2) bits, 307 tuning channel data of seven (7) bits, respectively. A reference numeral 308 depicts a portion of the antenna control signal, which is transmitted next to the antenna control signal of 302-307, and it is also assumed that a transmission start time thereof is "S".

The receiving antenna control signal shown in FIG. 3 is regulated to be Antenna Control Interface in EIA/CEEA909 standard, and it has sixteen (16) ways or manners when setting the direction thereof, two (2) ways or manners when setting the polarity thereof, and four (4) ways or manners when setting the amplification factor thereof. Accordingly, the receiving antenna can be set into 128 ways in total, when setting up the condition thereof. Also, the clock frequency of the serial data is 8 kHz; i.e., the clock frequency "T" is already determined at 125 microseconds. And, a distance from the time when the set of antenna control signals are transmitted up to the time when the next antenna control signals, i.e., the distance between the time "t=19T" and the time "t=S"; it is also already determined that a space must be 10 milliseconds or more therebetween. Accordingly, the time necessary for setting up a one (1) set of receiving antenna is 12.375 milliseconds. Therefore, it needs 1.584 seconds at the lowest, to conduct all of the setups for the receiving antenna, i.e., 128 ways. For example, when making determination on the receiving conditions, in the combinations of all the setups for the receiving antenna, in particular, for all of the physical channels in the arrangements of the physical channels, which are regulated in the U.S. terrestrial broadcasting, the time necessary for setting up the receiving antenna during the channel search comes to 107 seconds at the lowest, and this results in the factor of elongation of time for the channel search. However, the control signals for controlling the antenna controller portion 102 from the controller portion 105 within the receiving apparatus according to the present embodiment should not be restricted to the serial data system, as is shown in FIG. 3, but a plural number of combinations may be expected, in the kinds and the bit numbers thereof, and the clock frequency and the distance of data transmission, etc.

On a while, the time comes to be about 0.5 milliseconds, which is necessary for conducting the control upon the tuner portion 103, within the receiving apparatus according to the present embodiment.

Figure 4:
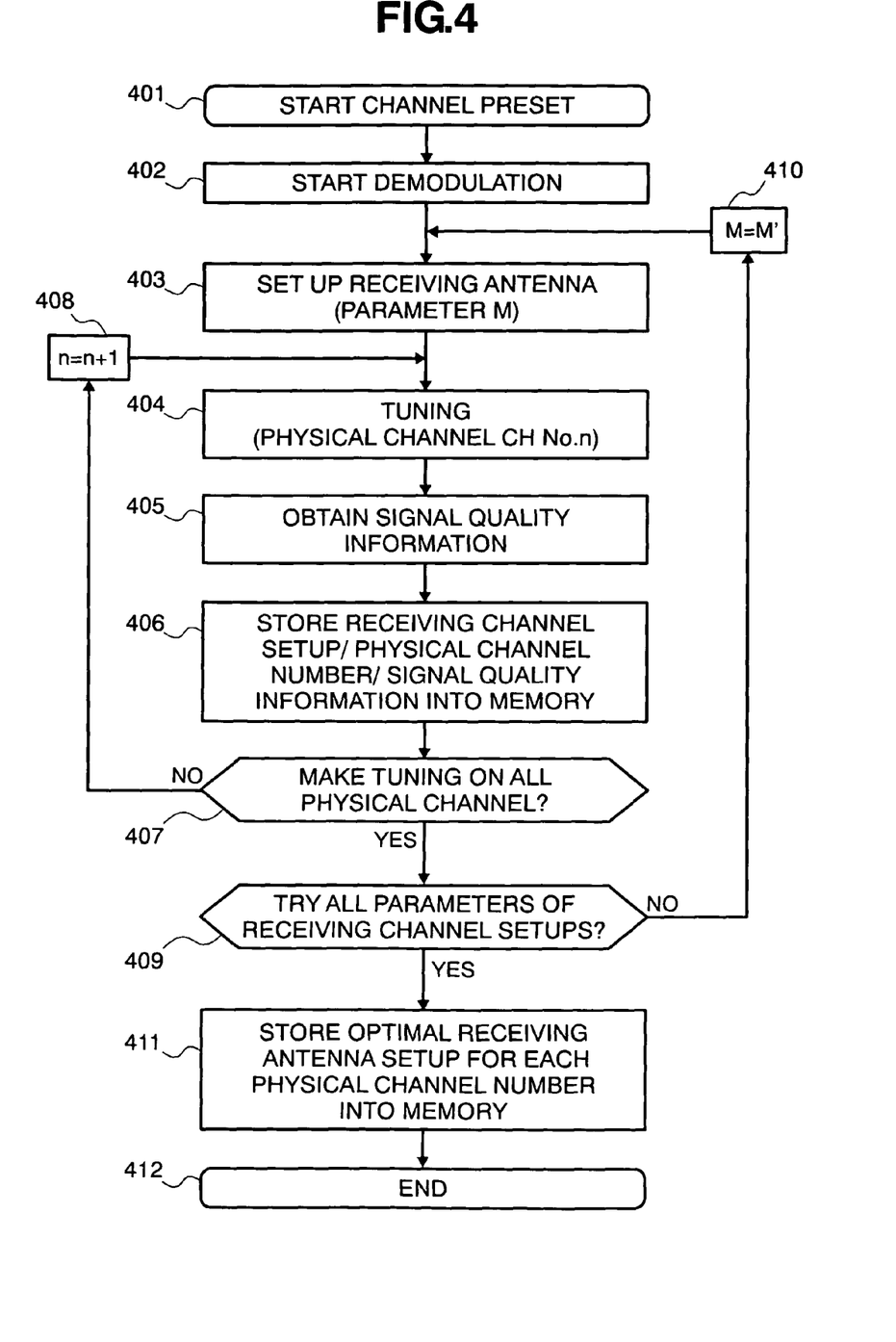
FIG. 4 is a flowchart for explaining the operation of obtaining a receiving antenna setup for each physical channel, by executing an automatic channel scan, within a first embodiment according to the present invention.

FIG. 4 shows a flowchart for explaining about the operations for obtaining the setups of the receiving antenna for the respective physical channels, executing an automatic channel scanning, as an initial channel preset function or a re-channel presetting function, within the receiving apparatus according to the present embodiment. Hereinafter, explanation will be made with taking an example of the physical channel arrangement, which is regulated in the U.S. terrestrial broadcasting.

First of all, the initial channel preset is executed in a step 401, upon an instruction made by a user, and then the process is advanced into a step 402. Next, the controller portion 105 makes the signal processor portion 104 starting operations of the demodulation and the error correction, corresponding to the broadcasting method, and advances into a step 403. The demodulation and the error correction in the step 403 are those corresponding to the 8VSB (8 values Vestigial Side Band) modulation method, the Trelis coding, and/or the Reed-Solomon coding, in the case of the U.S. terrestrial digital broadcasting. Next, in the step 403, the controller portion 105 controls the antenna controller portion 102, so that the setup for the receiving antenna 101 is the initial one, and advances the process into a step 404.

Next, in the step 404, the controller portion 105 controls the tuner portion 102 so as to tune into the smallest number of physical channels, for example, and then it advances the process into a step 405. Since an effective range of channels starts from "2" to "69", in particular, in the case of the U.S. terrestrial broadcasting, then the tuner sets up the channel number "2", first.

Next, in the step 405, the controller portion 105 obtains the signal quality information from the signal processor portion 104, and advances into a step 406. In this step 406, the controller portion 105 stores the receiving antenna setup, which is set up at the present, the physical channel number, which is tuned at the present, and the signal quality information of the receiving signal into the memory portion 106, while relating them to one another, then advances into a step 407. Also, in case when the synchronization condition is unlocked with the receiving signal in the step 405, i.e., when no existence can be acknowledged of the digital broadcasting radio wave at the setup of the present receiving antenna, for the physical channel on which the tuning is made, then the signal quality information is stored, but after converting the value thereof down to the lowest one, in the step 406.

Next, the controller portion 105 determines in the step 407, on whether the tuning is made up or not on all the physical channels, which are regulated by the U.S. terrestrial broadcasting, and then it goes into a step 409, if determining "YES", while into a step 408 if determining "NO". In the step 408, it renews the physical channel number to be tuned in the step 404 into a number larger than that by one (+1), and then it advances into step 404. After repeating a loop from the step 404 to the step 407 until when tuning is made up upon all of the physical channels, it advances into the step 409. However, with the initial channel preset method within the receiving apparatus according to the present embodiment, there is no necessity of restricting a manner or an order of the renewal in the step 408.

Next, the controller 105 determines in the step 409, on whether trial is made or not, upon all of the setup parameters to be set into the receiving antenna 101, and it goes into a step 411, if determining "YES", while it goes into a step 410 if determining "NO". In the step 410, the controller portion 105 renews the setup value to be set into the receiving antenna 101 next, among the setups for the receiving antenna, which are not yet set up in any one of the steps up to now, and it goes into a step 303. As the setup value to be set up in this step 410 may be expected the followings; such as, a setup for rotating the direction of an element of the receiving antenna 101 clockwise by only a predetermined angle, or a setup for changing the amplification factor of the receiving antenna 101, or a setup for changing the setup of the polarity-reversing portion of the receiving antenna 101, or a setup for changing plural setups at the same time, etc. However, with the initial channel preset method within the receiving apparatus according to the present embodiment, there is no necessity of restricting the order or manner of the renewal in the step 410. Also, with the control signals for the receiving antenna shown in FIG. 2, there are 128 ways of the setups for the receiving antenna in combination thereof, however an effect of the present embodiment cannot be lost even in case when not trying a part of the combinations among of those.

Next, in the step 411, the controller portion 105 stores the setups of the receiving antenna 101 for the each physical channel number, at which the receiving signal comes to be optimal on the signal quality thereof, into the memory portion 106, upon basis of the information, which is stored in the memory portion in the step 406, and then it goes into a step 412. It is assumed that the setups of the receiving antenna, to be stored into the memory portion 106 in the step 411, are only those corresponding to the physical channel numbers, each having a setup of the receiving antenna, which exceeds a threshold value (a reference value) determined in advance in the quality of receiving signal. This threshold value results to be an indication of whether the broadcasting radio waver is receivable for the user or not, without any problem, for example, by determining the bit error ratio, upon which the final error after the error correction can be considered to be zero (0), or the SNR of the receiving signal. Also, in this step 411, for maintaining the memory capacity of the memory portion 106, it is also possible to delete the information stored in the step 406. Next, the controller portion 105 completes the channel-preset function in the step 412.

Explanation will be made about the operations when the user conducts tuning into the channel preset, after conducting such channel preset as was mentioned above. In case when an instruction is made by the user to tune in the channel having the physical channel number "K", for example, the controller portion 105 obtains the setup value corresponding to the physical channel number "K" from the memory portion 106, among the optimal setup values of the receiving antenna 101 that are stored in the step 311 of the initial channel preset. Then, the controller portion 105 sets the setup value obtained into the antenna controller portion 102, thereby controlling the receiving antenna 101 to be optimal in the setup at the physical channel to be tuned in.

With such operations as mentioned above, in case when determining the receiving condition on all the combinations of the setups of receiving antenna for all of the physical channels, in particular, when trying to execute the channel preset function upon all the physical channels, it takes a time about 107 seconds at the shortest, necessary for the setup of receiving antenna during the channel research, on the contrary thereto, the time necessary for the setup of receiving antenna comes down to 1.584 seconds at the lowest, by chaining the number of times for controlling the setup of the receiving antenna 101 to be the number of combinations of the setups of receiving antenna. Thus, it is possible to shorten the time necessary for the channel preset.

It is not necessary to say that, but further shortening can be achieved upon the time necessary for the channel preset, also in case when the tuner portions and/or the demodulator portions are provided in a plural number thereof, with dividing the physical channels to be tuned by each the tuner in the channel preset.

Embodiment 2

Figure 5:
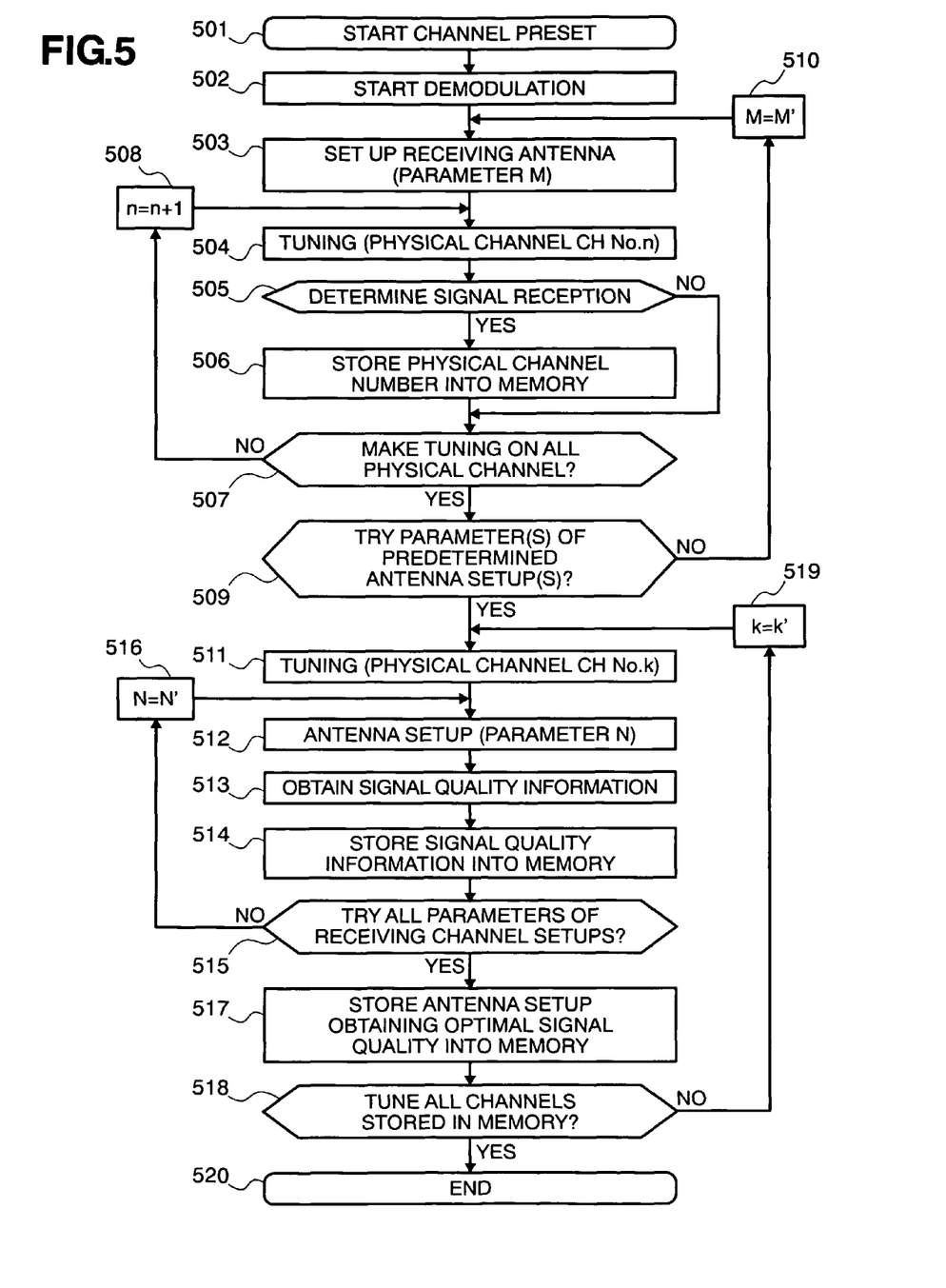
FIG. 5 is a flowchart for explaining the operation of obtaining a receiving antenna setup for each physical channel, by executing an automatic channel scan, within a second embodiment according to the present invention.

Hereinafter, explanation will be made about a method for the initial channel preset in the receiving apparatus according to a second embodiment. FIG. 5 is a flowchart for explaining the operations, such as, executing the automatic channel scanning and obtaining the setups of receiving antenna for each of the physical channels, respectively, as the initial channel preset function or the re-channel preset function in the receiving apparatus according to the present embodiment. Hereinafter, explanation will be made with taking an example of the physical channel arrangement, which is regulated in the U.S. terrestrial broadcasting.

First of all, the initial channel preset is executed in a step 501, upon an instruction made by a user, and then the process is advanced into a step 502. Next, the controller portion 105 makes the signal processor portion 104 starting operations of the demodulation and the error correction, corresponding to the broadcasting method, and advances into a step 503. The demodulation and the error correction in the step 502 are those corresponding to the 8VSB (8 values Vestigial Side Band) modulation method, the Trelis coding, and/or the Reed-Solomon coding, in the case of the U.S. terrestrial digital broadcasting.

Next, in a step 503, the controller portion 105 controls the antenna controller portion 102, so that the setup for the receiving antenna 101 be the initial one, and advances the process into a step 504.

Next, in the step 504, the controller portion 105 controls the tuner portion 102 so as to tune into the smallest number of physical channels, for example, and then it advances the process into a step 505. Since an effective range of channels starts from "2" to "69", in particular, in the case of the U.S. terrestrial broadcasting, then the tuner sets up the channel number "2", first.

Next, in the step 505, the controller portion 105 obtains the synchronizing condition with the receiving signal, from the signal processor portion 104, among the signal quality information, and in case when being in synchronism with the receiving signal, i.e., in case where an acknowledge can be made on existence of the digital broadcasting radio wave at the present setup of the receiving antenna, with respect to the physical channel, on which tuning is made, the process advances into a step 506. In case when not being in synchronism with the receiving signal, i.e., in case where an acknowledge cannot be made on existence of the digital broadcasting radio wave at the present setup of the receiving antenna, with respect to the physical channel, on which tuning is made, the process advances into a step 507. In the step 506, the controller portion 105 stores the physical channel number into the memory portion 106, on which tuning is made at present, as being the physical channel where the digital broadcasting radio wave exits. However, a criterion for determining the existence of the signal in the step 505 may be a SNR of receiving signal, which is equal to a predetermined threshold value or larger than that, or an error ratio equal to a predetermined threshold value or smaller than that.

Next, the controller portion 105 determines in the step 507, on whether the tuning is made up or not on all the physical channels, which are regulated by the U.S. terrestrial broadcasting, and it goes into a step 509, if determining "YES", while into a step 508 if determining "NO". In the step 508, it renews the physical channel number to be tuned in the step 504 into a number larger than that by one (+1), and it advances into the step 504. After repeating a loop from the step 504 to the step 507 until when tuning is made up on all of the physical channels, then it advances into the step 509. However, with the initial channel preset method within the receiving apparatus according to the present embodiment, there is no necessity of restricting a manner or an order of the renewal in the step 508.

Next, the controller 105 determines in the step 509, on whether trial is made or not, upon a predetermined setup parameter to be set into the receiving antenna 101, and it goes into a step 511 if determining "YES", while it goes into a step 510 if determining "NO". As the setup value to be a criterion for termination in the step 509 can be considered the followings: for example, the sixteen (16) setup parameters in the number of combinations, of trying the sixteen (16) manners or ways of the direction setups while fixing the polarity setup and the amplification factor setup; and the eight (8) setup parameters in the number of combinations, of trying two (2) manners or ways of the amplification factors and four (4) manners or ways of the direction setup while fixing the polarity setup, among the direction setup, the polarity setup and the amplification factor setup of the receiving antenna, which are set up through the receiving antenna control signals shown in FIG. 2. However, with the initial channel preset method in the receiving apparatus according to the present embodiment, there is no necessity of restricting the predetermined setup parameters to be the criteria for determination in the step 509.

In the step 510, the controller portion 105 renews the setup value to be set into the receiving antenna 101 next, among the setups of the receiving antenna that are not yet set up in any one of the steps up to now, and it goes into a step 503. As the setup value to be setup in this step 510 may be expect the followings; such as, setup for rotating the direction of an element of the receiving antenna 101 clockwise by only a predetermined angle, or setup for changing the amplification factor of the receiving antenna 101, or setup for changing the setup of the polarity-reversing portion of the receiving antenna 101, or setup for changing plural setups at the same time, etc. However, with the initial channel preset method in the receiving apparatus according to the present embodiment, there is no necessity of restricting the manner or order of the setup in the step 510.

Next, in the step 511, the controller portion 105 controls the tuner portion 102 so as to tune into, for example, the smallest number of physical channels among the physical channels, which re stored into the memory portion in the step 506, and then it advances into a step 512.

Next, in the step 512, the controller portion 105 controls the antenna controller portion 102 so that the setup of the receiving antenna 101 be in the initial setting, and it advances into a step.

Next, in the step 513, the controller portion 105 obtains the signal quality information from the signal processor portion 104, and it advances into a step 514. In this step 514, the controller portion 105 stores the setup for the receiving antenna, which is set up at the present, the physical channel number, which is tuned at the present, and the signal quality information of the receiving signal into the memory portion 106, while relating them to one another, then advances into step 515. Also, in case when the synchronizing condition is unlocked with the receiving signal in the step 513, i.e., when no existence can be acknowledged of the digital broadcasting radio wave at the setup of the present receiving antenna, for the physical channel on which the tuning is made, then the signal quality information is stored, but after converting the value thereof down to the lowest one, in the step 514.

Next, the controller 105 determines in the step 515, on whether trial is made or not, upon all of the setup parameters to be set into the receiving antenna 101, and it goes into a step 517, if determining "YES", while it goes into a step 516 if determining "NO".

In the step 516, the controller portion 105 renews the setup value to be set into the receiving antenna 101 next, among the setups for the receiving antenna, which are not yet set up in the steps 512 to 516, and it goes into the step 512. As the setup value to be set up in this step 516 may be expected the followings; such as, a setup for rotating the direction of an element of the receiving antenna 101 clockwise by only a predetermined angle, or a setup for changing the amplification factor of the receiving antenna 101, or a setup for changing the setup of the polarity-reversing portion of the receiving antenna 101, or a setup for changing plural setups at the same time, etc.

However, with the initial channel preset method within the receiving apparatus according to the present embodiment, there is no necessity of restricting the order or manner of the renewal in the step 516. Also, with the control signals for the receiving antenna shown in FIG. 2, there are 128 ways of the setups for the receiving antenna in combination thereof, however the effect of the present embodiment cannot be lost even in case when not trying a part of the combinations among of those.

Next, in the step 517, the controller portion 105 stores the setups of the receiving antenna 101 for each of the physical channel numbers, at which the receiving signal comes to be optimal on the signal quality thereof, into the memory portion 106, upon basis of the information, which is stored in the memory portion in the step 514, and then it goes into a step 518. It is assumed that the setups of the receiving antenna, to be stored into the memory portion 106 in the step 517, are only those corresponding to the physical channel numbers, each having the setup of the receiving antenna, which exceeds a threshold value (a reference value) determined in advance in the quality of receiving signal. This threshold value results to be an indication of whether the broadcasting radio waver is receivable for the user or not, without any problem, for example, by determining the bit error ratio, upon which the final error after the error correction can be considered to be zero (0). Also, in this step 517, for maintaining the memory capacity of the memory portion 106, it is also possible to delete the information stored in the step 514.

Next, in the step 518, the controller portion 105 determines on whether the tuning is conducted or not, on all of the physical channels, which are memorized into the memory portion 106 in the step 506, and it advances into a step 520 if determining "YES", while it goes into a step 519 if determining "NO". In the step 519, it makes renewal from the physical channel, which is memorized into the memory portion 106 in the step 506, to the physical channel number, on which the tuning is not yet made in the step 511, and advances into the step 511. After repeating a loop from the step 511 to the step 519 until when tuning is made up upon all of the physical channels, which are memorized into the memory portion in the step 506, it advances into the step 520. However, with the initial channel preset method within the receiving apparatus according to the present embodiment, there is no necessity of restricting a manner or an order of the renewal in the step 519. Next, the controller portion 105 completes the channel-preset function in the step 520.

When a user makes tuning on the channel that is preset, after conducting such the channel preset as was mentioned above, the control is conducted in accordance with the method similar to that of the embodiment 1.

With the operations mentioned above, in case when executing the channel preset function on all the physical channels, obtaining the receiving conditions of all the setups of the receiving antenna 101, but only in the channels where the digital broadcastings exist, enables to shorten the time necessary for the channel preset.

Also, with the initial channel preset method conducted within the receiving apparatus according to the present embodiment, further shortening can be achieved of the time, through replacing the steps 511 to 518 with the steps 403 to 411 shown in FIG. 4, and setting the criterion for determination in the step 407 to be "tuning is conducted on all the physical channels, which are memorized into the memory portion 106 in the step 506".

And, it is needless to say that, also in a case where the tuner portions and/or the demodulator portions are provided in a plural number thereof, further shortening of the time necessary for the channel preset can be obtained, by dividing the physical channels to be tuned in each of the tuners in the channel preset.

The present invention may be embodied in other specific forms without departing from the spirit or essential feature or characteristics thereof. Further, the embodiments mentioned above include various inventive ideas therein, and also the various inventive ideas can be extracted from appropriate combinations of plural constituent elements disclosed therein. For example, if deleting some from the constituent elements shown in the embodiments, however, the present invention may cover the structures, from which such the constituent element(s) is/are deleted, as for as they can accomplish at least one of the objects of the present invention, and/or can enjoy the effects mentioned in the above.

The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A receiving apparatus, comprising:
    an antenna controller portion which determines a set-up parameters for setting up an antenna, wherein said antenna receives broadcasting signals having audio signals and video signals;
    a tuner which tunes in a plurality of selected channels of broadcasting signals, among said broadcasting signals received by said antenna;
    a signal quality information obtaining portion, which obtains signal quality information for each of said plurality of selected channels of broadcasting signals tuned by said tuner;
    a memory which memorizes said signal quality information for each of said plurality of selected channels of broadcasting signals; and
    a controller which controls said antenna controller portion, said tuner, said signal quality information obtaining portion and said memory;
    wherein when conducting a channel search, said controller controls said antenna controller portion, said tuner, said signal quality information obtaining portion and said memory such that after said antenna controller portion determines a first set-up parameter, said signal quality information obtaining portion obtains signal quality information for each of said plurality of selected channels under said first set-up parameter, and stores into said memory said signal quality information for each of said plurality of selected channels obtained under said first set-up parameter, and such that after said antenna controller portion determines a second set-up parameter, said signal quality information obtaining portion obtains signal quality information for each of said plurality of selected channels under said second set-up parameter, and stores into said memory said signal quality information for each of said plurality of selected channels obtained under said second set-up parameter.

2. The receiving apparatus, as described in the claim 1, wherein said set-up parameters for said antenna include channel information which is tuned in said tuner.

3. The receiving apparatus, as described in the claim 1, wherein said set-up parameters for said antenna comprise at least one of a direction indicative of directivity, a polarity, and an amplification factor of the antenna, in a part of said antenna or all thereof.

4. The receiving apparatus, as described in the claim 1, wherein said controller controls at least one of a direction indicative of directivity, a polarity, and an amplification factor of the antenna, in a part or all thereof.

5. The receiving apparatus, as described in the claim 1, wherein the signal quality information, which is obtained by said signal quality information obtaining portion, is in a synchronized condition with a receiving signal.

6. The receiving apparatus, as described in the claim 1, wherein the signal quality information, which is obtained by said signal quality information obtaining portion, is a signal to noise ratio.

7. The receiving apparatus, as described in the claim 1, wherein the signal quality information, which is obtained by said signal quality information obtaining portion, is a bit error rate.

8. The receiving apparatus, as described in the claim 1, wherein the signal quality information, which is obtained by said signal quality information obtaining portion, is AGC voltage.

9. The receiving apparatus, as described in the claim 1, wherein said antenna controller portion stores into said memory, in relation to each of said plurality of selected channels, either of said first set-up parameter or said second set-up parameter, whichever has the optimal stored signal quality information.

10. The receiving apparatus, as described in the claim 8, wherein said antenna controller portion stores into said memory, in relation to each of said plurality of selected channels, either of said first set-up parameter or said second set-up parameter, whichever has the optimal stored signal quality information, only if the optimal stored signal quality information exceeds a threshold quality value determined in advance of obtaining signal quality information.

11. The receiving apparatus, as described in the claim 10, wherein each of said first set-up parameter and said second set-up parameter for said antenna comprise at least one of a direction indicative of directivity, a polarity, and an amplification factor of the antenna, in a part of said antenna or all thereof.

12. The receiving apparatus, as described in the claim 11, wherein said tuner sequentially tunes in said plurality of selected channels of broadcasting signals.

* * * * *